Patented Jan. 26, 1937

2,069,117

UNITED STATES PATENT OFFICE 2,069,117

PROCESS OF PREPARING RESINOUS CONDENSATION PRODUCTS CONTAINING UREA OR ITS DERIVATIVES

Fritz Seebach, Erkner, near Berlin, Germany, assignor, by mesne assignments, to Bakelite Corporation, New York, N. Y., a corporation of Delaware No Drawing. Application January 20, 1932, Serial No. 587,764. In Germany January 23, 1931

9 Claims. (Cl. 260—3)

The present invention relates to the preparation of resinous condensation products from urea or its substituted products with acid amids, and formaldehyde or substances yielding formaldehyde. It has been found that acet-amid $CH_3CONH_2$ and related substances have a decided affinity for the various compositions formed from urea and formaldehyde, and that they are capable of participating in the reaction of formaldehyde and urea to yield important resinous products. The affinity of the acet-amid for urea-formaldehyde condensation products becomes evident for example in its hitherto unknown behavior toward methylene urea, the simplest condensation product of urea and formaldehyde. If methylene-urea $C_2H_4N_2O$ is heated with acet-amid, the methylene-urea which is otherwise insoluble in solvents with the exception of acids, enters in solution at temperatures above 100°, and a new compound crystallizes from the fused mass that upon analysis has a formula $C_8H_{14}N_4O_3$. This formula is confirmed by the molecular weight determination in glacial acetic acid of 265. The calculated molecular weight is 214, and it is assumed that a new combination of methylene-urea and acet-amid is formed by the condensation of 3 molecules of acet-amid with 1 molecule methylene-urea according to the following equation:

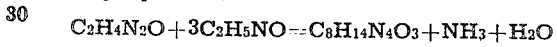

$$C_2H_4N_2O + 3C_2H_5NO = C_8H_{14}N_4O_3 + NH_3 + H_2O$$

According to this equation ammonia and water escape from the reaction mixture.

The preparation of condensation products from urea, formaldehyde, and acid amids or the like can be accomplished in various ways because of these hitherto unknown characteristics of the acet-amids. As an example urea can be dissolved in acet-amid. In the blending of these two materials a relationship is made evident since both substances combine into a fused mass even at around 50°. When paraformaldehyde is added to this mixture in the proportion of about 2 mols. formaldehyde per 1 mol. urea, a reaction takes place at about 110° with the separation of water vapors. Instead of paraformaldehyde formaldehyde solutions or hexamethylene-tetramine can be used and more or less than 2 mols formaldehyde can be brought into reaction with the urea. For example the urea and the acetamid can be dissolved in a 40% aqueous formaldehyde solution and condensation effected by heating, or the fused mass of urea and acetamid can be reacted with a mixture of paraformaldehyde and hexamethylenetetramine. The resulting reaction product when cooled either will be a syrupy or solid resinous mass, depending upon the heating period and proportions of the reaction components. This mass may be placed or poured into molds with or without addition of fillers, dyes, plasticizers, or other materials customary in hardenable resinous products, and hardened in the mold with or without simultaneous application of pressure. The manufacture of the condensation products with or without the usual additions may be accomplished in any desired manner, for example by kneading the condensation products with the additions in kneading machines with the application of heat or by working on calenders, or by grinding or the like. For the preparation of molded articles it is advantageous to use the well-known hot-molding process to which the condensation products, or their mixtures with additional materials with a previous crushing and drying if necessary, are subjected.

Ureas can also be added to the condensation product after cooling and paraformaldehyde can be stirred in at a little higher temperature, for example at 40–60°. The condensation of formaldehyde, urea and acetamid can be influenced by using acid, basic or neutral catalysts, as for example soda lye, ammonia, pyridin, organic or inorganic acids, metal salts, etc.

Example 1

60 parts urea and 120 parts acetamid are fused together. Melting begins at 50°. 70 parts paraform are added, and then the mass is heated to 100°. At approximately 110° a chemical reaction sets in, characterized by a gentle foaming and emission of water vapors. After the reaction is stopped, 60 parts more of urea and 70 parts more of paraformaldehyde are stirred in and kept at 50–60° for some time. The mass is white when cold and very viscous. It keeps for an indefinite period and can be kneaded with fillers for molding into any type of electrical and technical articles. It hardens very rapidly at 100° without any discoloration.

Example 2

120 parts acetamid are fused with 120 parts urea. While keeping the mass at 70°, 120 parts paraformaldehyde are added, and held at a temperature of 70–80° for 5 minutes; then 120 parts urea and 120 parts paraformaldehyde are added and stirred into a homogeneous mass. When even distribution is accomplished, again 120 parts urea are added and 120 parts paraformaldehyde are stirred in. This mass is then kneaded while 400 parts lithopone and 100 parts white filler (cotton), are added.

*Example 3*

The procedure of Example 2 is followed but as a filler is added 120 parts ground acetyl-cellulose and 120 parts lithopone.

In mixture with urea or in place of it can be used urea derivatives, for example thio-urea, or substituted ureas, herein classed as urea; or urea may be mixed with phenols and then condensed with a proportionate quantity of formaldehyde. Instead of acet-amid one can use amids of other acids, for example benzamid and substituted acid amids, such as acetanilid or formanilid. The acetanilid condensation is suitably carried out for example at temperatures between 100 and 110° yielding clear resole-like masses. Furthermore, instead of the amids the corresponding nitriles, for example acetonitril can be used. These substances can also be used in admixture. The resulting condensation products are always light-resistant and transparent or opaque according to the course of the condensation and the proportions employed; and the hardened products likewise can be prepared in transparent condition, clear as glass, or opaque. In making the condensation products into molded articles, the well-known organic or inorganic fillers can be employed. The condensation products are suitable for use in dissolved condition for the manufacture of lacquers or for the impregnation of fibrous materials or fabric sheets and for the manufacture of cardboard, molded panels, or the like.

I claim:

1. Process of preparing a resinous product from a urea which comprises causing a reaction between a urea and an aldehyde in the ratio of one mol. of urea to two mols of aldehyde in the presence of a monoamid of a carboxylic acid and incorporating with the reaction mixture further amounts of urea and aldehyde, the monoamid being present in a molar ratio equivalent to at least 1 mol. to every 9 mols of the total urea and aldehyde to yield a product capable of being mixed with a filler to form a moldable plastic composition hardening under the action of heat.

2. Process of preparing a resinous product from a urea which comprises causing a reaction between a urea and an aldehyde in the ratio of one mol. of urea to two mols of aldehyde in the presence of a monoamid of a carboxylic acid in a molar ratio equivalent to at least 1 mol. of the monoamid to every 9 mols of total urea and aldehyde to yield a product capable of being mixed with a filler to form a moldable plastic composition hardening under the action of heat.

3. Process according to claim 2 in which the monoamid is an acetamid.

4. Process according to claim 2 in which the monoamid is an acetanilid.

5. Process according to claim 2 in which the aldehyde is in anhydrous form.

6. Resinous reaction product of a urea and an aldehyde in the ratio of one mol. of urea to two mols of aldehyde in the presence of a monoamid of a carboxylic acid in a molar ratio equivalent to at least 1 mol. of the monoamid to every 9 mols of total urea and aldehyde, said product being capable of being mixed with a filler to form a plastic moldable composition hardening under the action of heat.

7. Resinous product according to claim 6 in which the monoamid is acetamid.

8. Product according to claim 6 in which the monoamid is acetanilid.

9. Product according to claim 6 in which the aldehyde is in anhydrous form.

FRITZ SEEBACH.